(12) United States Patent
Kemp et al.

(10) Patent No.: US 10,131,996 B2
(45) Date of Patent: Nov. 20, 2018

(54) CARBON DIOXIDE TRANSFORMATION FACILITATED BY EARTH ABUNDANT METALS

(71) Applicants: Richard Kemp, Albuquerque, NM (US); Diane A. Dickie, Albuquerque, NM (US); Elizabeth S. Donovan, Albuquerque, NM (US); Brian Barry, Dubuque, IA (US)

(72) Inventors: Richard Kemp, Albuquerque, NM (US); Diane A. Dickie, Albuquerque, NM (US); Elizabeth S. Donovan, Albuquerque, NM (US); Brian Barry, Dubuque, IA (US)

(73) Assignee: STC.UNM, Albuquerque, NM (US)

( * ) Notice: Subject to any disclaimer, the term of this patent is extended or adjusted under 35 U.S.C. 154(b) by 223 days.

(21) Appl. No.: 15/123,900

(22) PCT Filed: Mar. 3, 2015

(86) PCT No.: PCT/US2015/018435
§ 371 (c)(1),
(2) Date: Sep. 6, 2016

(87) PCT Pub. No.: WO2015/134457
PCT Pub. Date: Sep. 11, 2015

(65) Prior Publication Data
US 2017/0016126 A1    Jan. 19, 2017

Related U.S. Application Data

(60) Provisional application No. 61/947,109, filed on Mar. 3, 2014.

(51) Int. Cl.
*C25B 1/00* (2006.01)
*C25B 3/04* (2006.01)
(Continued)

(52) U.S. Cl.
CPC .............. *C25B 3/04* (2013.01); *B01J 31/189* (2013.01); *B01J 31/1815* (2013.01); *C25B 1/00* (2013.01);
(Continued)

(58) Field of Classification Search
None
See application file for complete search history.

(56) References Cited

U.S. PATENT DOCUMENTS

2007/0036706 A1    2/2007   Ogo et al.
2014/0339098 A1*  11/2014   Mazur ................. C25B 11/0447
                                                                  205/555

FOREIGN PATENT DOCUMENTS

WO    2011043483 A1    4/2011
WO    2013087792 A2    6/2013

OTHER PUBLICATIONS

Budnikova, Y. G. et al., 'Electrochemical reduction of cobalt and nickel complexes with ligands stabilizing metal in low oxidation state', Jul. 2003, vol. 52, No. 7, pp. 1504-1511.
(Continued)

*Primary Examiner* — Arun S Phasge
(74) *Attorney, Agent, or Firm* — Gonzales Patent Services; Ellen M. Gonzales

(57) ABSTRACT

Novel complexes of various earth-abundant, inexpensive transition or main group metals that facilitate the transformation of carbon dioxide into other more useful organic products. These complexes can bind and alter the $CO_2$ at mild conditions of temperature and pressure, enabling, according to some embodiments, the electrochemical conversion of $CO_2$ into new products.

20 Claims, 6 Drawing Sheets

Basic Lone Pair on Donor (D)
Acidic Empty p Orbital on Metal (M)

Lewis Acid-Base Adduct

(51) Int. Cl.
*C25B 11/04* (2006.01)
*B01J 31/18* (2006.01)

(52) U.S. Cl.
CPC ..... *C25B 11/0405* (2013.01); *B01J 2231/625* (2013.01); *B01J 2531/26* (2013.01)

(56) References Cited

OTHER PUBLICATIONS

Carmona. Ernesto et al., 'Electron-rich metal complexes for $CO_2$ and $CS_2$ Incorporation', Pure and Applied Chemistry, 1989, vol. 61, No. 10, pp. 1701-1706.

* cited by examiner

Basic Lone Pair on Donor (D)
Acidic Empty p Orbital on Metal (M)

Lewis Acid-Base Adduct

CARBON DIOXIDE TRANSFORMATION FACILITATED BY EARTH ABUNDANT METALS

CROSS-REFERENCE TO RELATED APPLICATIONS

The following application claims benefit of U.S. Provisional Application No. 61/947,109, filed Mar. 3, 2014, which is hereby incorporated by reference in its entirety.

STATEMENT REGARDING GOVERNMENT SPONSORED RESEARCH

This invention was made with Government support under Grant Nos. LDRD 151300 and DE-AC04-94AL85000 awarded by the Department of Energy and Sandia National Laboratories, and Grant Nos. CHE09-11110 and CHE-1213529 awarded by the National Science Foundation (NSF). The U.S. Government has certain rights in this invention.

BACKGROUND

Carbon dioxide ($CO_2$) is a notable greenhouse gas and rising concentrations of atmospheric $CO_2$ is a pressing global environmental issue. Accordingly, mechanisms for converting, breaking down, or otherwise altering $CO_2$ into non-harmful or even useful products are greatly desired. For example, $CO_2$ can be considered as a $C_1$ chemical building block. As such, conversion of $CO_2$ into useful chemical feedstock by homogeneous or heterogeneous catalysis is one mitigation approach that is receiving significant scientific inquiry. To this end, the pyridinium ion has been shown to electrocatalytically reduce $CO_2$ to methanol with palladium (Pd) or platinum (Pt) electrodes. However, current methods for transformation of $CO_2$ typically require expensive components like platinum or palladium or difficult reaction chemistries. Accordingly, there is a need for novel reactants and reaction pathways for the conversion of $CO_2$.

SUMMARY

The present disclosure provides novel coordination or organometallic complexes of various earth-abundant, inexpensive transition or main group metals that facilitate the transformation of carbon dioxide into other more useful organic products. These complexes can bind and alter the $CO_2$ at mild conditions of temperature and pressure, enabling, according to some embodiments, the electrochemical conversion of $CO_2$ into new products.

DETAILED DESCRIPTION

According to an embodiment the present disclosure provides novel complexes of various earth-abundant, inexpensive transition or main group metals. According to some embodiments these complexes are able to interact with carbon dioxide ($CO_2$) in a novel manner that, in some cases, facilitates the transformation of carbon dioxide into other more desired products. According to another embodiment the present disclosure provides a novel mechanism for carbon dioxide reduction facilitated by the novel complexes disclosed herein.

According to a first, general, embodiment, the present disclosure provides novel $CO_2$-containing adducts wherein the $CO_2$ is bound in a unique fashion by utilizing a donor pair concept. For the purposes of the present disclosure, the term "adduct" means a product of two or more chemical species that through their interactions result in a single molecular species. In general, the adduct of the present disclosure comprises a complex formed when $CO_2$ binds with a compound comprising or consisting of a metal and a ligand. According to specific embodiments, the ligand provides a Lewis base site to bind the electrophilic carbon center of $CO_2$ and the metal binds one of the nucleophilic oxygen atoms of the $CO_2$. A unique aspect of the presently described adducts is that according to some embodiments, the $CO_2$ molecule is able to coordinate to and then detach from the metal complex center, thereby regenerating the starting complex. According to further embodiments, the $CO_2$ molecule is bent when coordinated to the metal complex. This non-linear geometry of the $CO_2$ when bound by the metal complex is highly beneficial as it reduces the energy penalty that must be paid for converting linear $CO_2$ into other geometries found in various useful building blocks. This penalty is generally believed to be one of the major hindrances in electrochemically reducing $CO_2$ to CO or other $C_1$ species and is seen, for example, when formates or alcohols are the desired final products of the reduction reaction.

Figure 1:
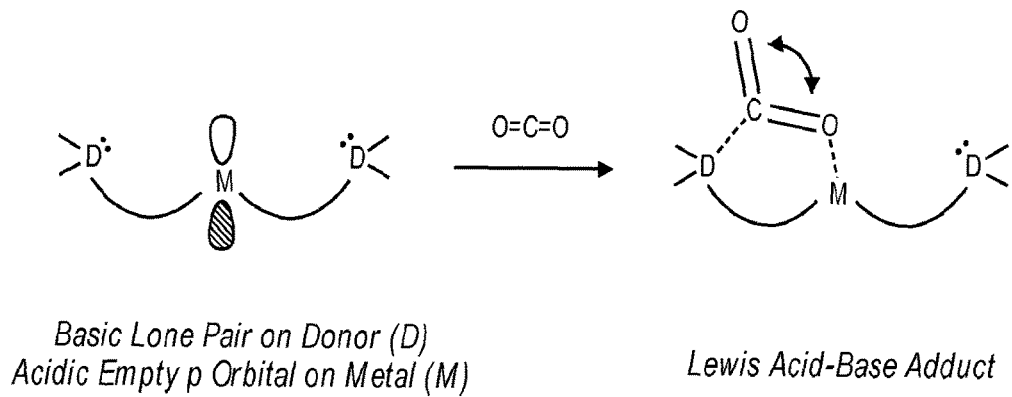
FIG. 1 is a general reaction scheme for the complexes of the present disclosure.

As stated above, the present disclosure provides novel metal-ligand complexes. FIG. 1 presents a general reaction scheme for the complexes of the present disclosure. In general, the adducts are believed to be formed by a combination of Lewis acid/base pairings between the amphoteric $CO_2$ molecule and the main group complex, quite similarly to the frustrated Lewis pair (FLP) concept developed by Stephan.[50-57] However, a key difference is that the presently disclosed chemical interaction does not have the large, sterically-demanding Lewis bases required in the earlier work, nor does it need highly-acidic Lewis centers such as $B(C_6F_5)_3$, as used by Stephan. In fact, according to some embodiments in the presently described system, strong Lewis acids may actually not be preferred.

The metal may be selected from a wide variety of earth abundant, plentiful metals from either the main group (s and p block elements) or inexpensive transition metals from the early-middle part of the Periodic Table. According to some embodiments, the metal may be divalent metals that are able to form $M^{II}$ complexes of the type $M(L)_2$. However, $M^{III}$ metals such as $Al^{III}$, $Ga^{III}$, $In^{III}$ and $Bi^{III}$ and $M^{IV}$ metals such as $Ge^{IV}$, $Sn_{IV}$ and $Pb^{IV}$ may also be used. Specific examples of suitable metals include Sn and Zn, with Zn being especially, though not exclusively, suitable for certain applications. Other suitable metals include Ti, Zr, Cr, Mo, Mn, Fe, Co, or Sb.

As a general overview the ligand should have the following properties: the ligand should bind strongly to the metal ion so that the metal-ligand complex can survive the electrochemical process, and the ligand should contain at least one additional atom that is capable of functioning as a Lewis base to allow an adduct to be formed with $CO_2$.

According to various non-limiting embodiments the ligand may have the general formula —$N(PR_2)_2$, where R is an alkyl or aryl group. For example, the ligand may be —$N(PPh_2)_2$ bis(diphenylphosphino)amine (DPPA), its alkyl derivatives, —$N(PR_2)_2$, or a modified version thereof. In addition, the ligands may be those that contain multiple Lewis base sites in order to coordinate both to the metal and to $CO_2$. Specific examples of suitable ligands of this type include, but are not limited to, the aminophosphine ligands, diphenyl-2-pyridylphosphine ($Ph_2Ppy$) and bis(2-pyridyl)phenylphosphine ($PhPpy_2$), which are shown complexed to $ZnCl_2$ in FIGS. 2 and 3.

Figure 4:
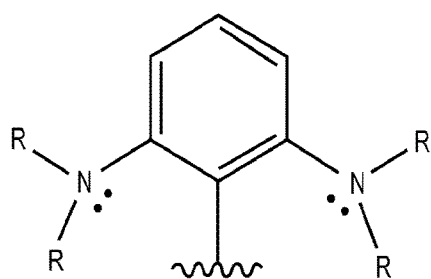
FIG. 4 is an illustration of a 2,6-disubstituted diorgano-amido-ligand.
Figure 5:
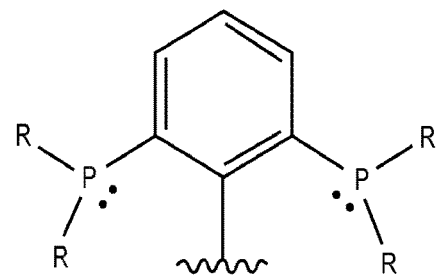
FIG. 5 is an illustration of a 2,6-disubstituted diorgano-phosphino-ligand.
Figure 6:
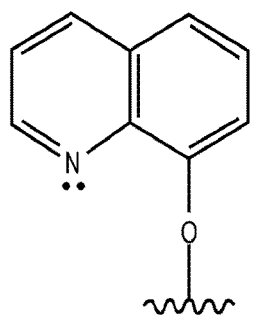
FIG. 6 is an illustration of an unsubstituted 8-hydroxy-quinoline ligand.
Figure 7:
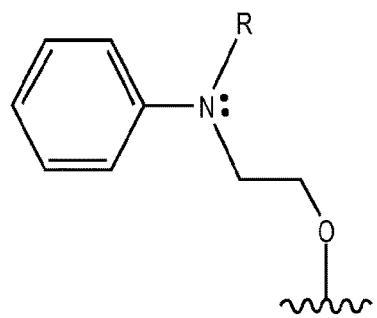
FIG. 7 is an illustration of an unsubstituted mixed alkoxy-amine ligand.
Figure 8:
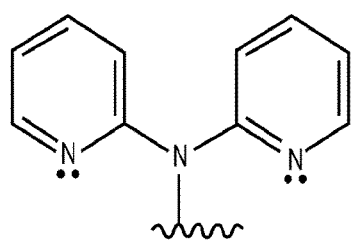
FIG. 8 is an illustration of an unsubstituted di(pyridyl) amido-ligand.
Figure 9:
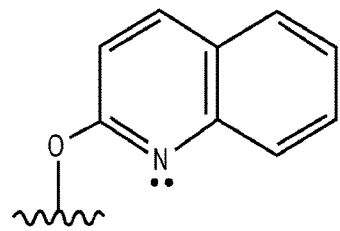
FIG. 9 is an illustration of an unsubstituted 2-hydroxy-quinoline ligand.

FIGS. 4-12 show additional ligands that can be used to form the complexes of the present disclosure. The ligands shown in FIGS. 4 and 5 are based on C-based rings. While the $M(L)_2$ complexes formed from these ligands will then contain a directly bound M-C bond, these M-C bonds are less reactive than P—N or N—Si. The presence of the R groups on the amine or phosphine arms allows for systematic modification of steric bulk. It is quite possible that in some embodiments these R groups will need to be relatively large in order to keep the initially-formed $M(L)_2$ complex from dimerizing in the solid state and in solution as well. While smaller groups such as methyls are easier to synthesize, or if dimers or oligomers are formed there is little chance that the $CO_2$ adduct will be able to break a dimeric structure as the $CO_2$ adduct is not as strong as the M-N dative bonds (Zn used here as an example). However, with larger groups on the N or P atoms there will be significantly less chance for this dimer to form.

The ligands shown in FIGS. 6-9 are non-limiting examples of specific hemilabile ligand types that can be reacted with (either as is or in modified form) main group or inexpensive transition metals to form $M(L)_2$ complexes. Of course those of skill in the art will understand that the structures shown can also be modified using various synthetic and preparative techniques that are well-known to those of skill in the art as needed, for example in order to alter the geometry of the donor N atom relative to the metal, so as to bind $CO_2$ more efficiently.

Figure 12:
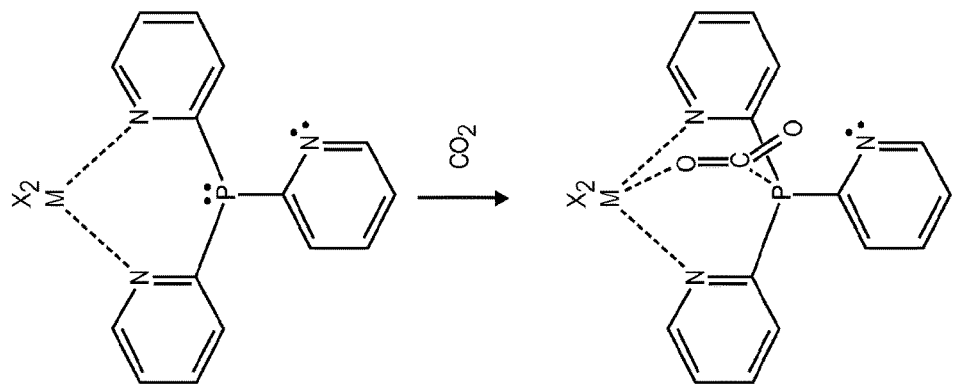
FIG. 12 depicts a possible coordination mode for $CO_2$ with a tri-pyridylphosphine complexed to a generic $MX_2$ metal.
Figure 11:
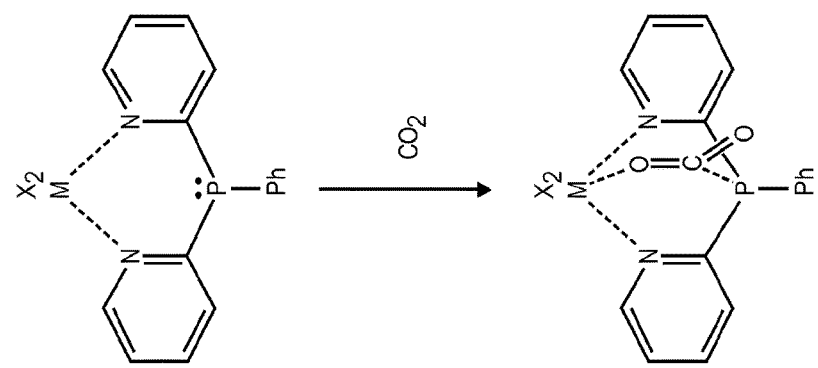
FIG. 11 depicts a possible coordination mode for $CO_2$ with a di-pyridylphosphine complexed to a generic $MX_2$ metal.
Figure 10:
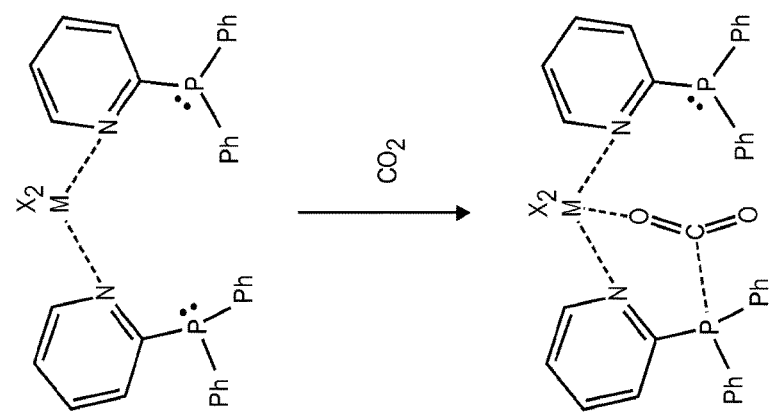
FIG. 10 depicts a possible coordination mode for $CO_2$ with a mono-pyridylphosphine complexed to a generic $MX_2$ metal.

The ligands shown in FIGS. 10-12 are non-limiting examples of a mono-pyridylphosphine (FIG. 10), a di-pyridylphosphine (FIG. 11), and a tri-pyridylphosphine (FIG. 12) complexed to a generic $MX_2$ metal. It is noted that while each of these compounds reacts with $CO_2$ under mild conditions as evidenced by reversible, C—O stretches being found in the IR spectra (consistent with $CO_2$ coordinating to and then detaching from the compound), it cannot be determined what the precise structures of the $CO_2$-containing products are, and thus the $CO_2$-containing structures shown in FIGS. 10-12 are mere speculation. In each case, the anion X can be altered to suit the exact system chosen, for example, so as to aid in solubility or to decrease water/proton sensitivity. Such alterations can be performed by using standard, well-known synthetic methods or by selecting starting materials that contain the desired X anion.

Furthermore, there has been recent attention paid to redox active or non-innocent ligands.[77] Briefly, these electron-rich ligands are designed such that they have a strong effect on the oxidation states of the metals to which they are bound. In effect, oxidation-reduction reactions can take place in the ligand itself, at the metal center, or at both in concert. Accordingly, redox-active ligands could also be possible components of the herein described $CO_2$ reduction chemistry, particularly in complexes that contain first or second row transition metals as key components. Alternatively, the ligands described above could be tuned to behave similarly to the redox active or non-innocent ligands. For example, the metal complexes shown at the top of FIGS. 10-12 can be synthesized to contain a molecule of ethylenediamine (en) chelated to the metal, by using en during preparation. However, it is possible to replace these non-active en ligands with bipyridine or other chelating redox active ligands during the preparation, in order to take advantage of the electrochemical properties of these ligands. Other redox active ligands, including those based on frameworks such as diimines,[79] phosphine-substituted aromatic thiolates,[80] aminophenols,[81-82] and aminophenols. Aminophenols in particular, bear a resemblance to the ligands shown in FIGS. 6-9 and thus offer possibilities as ligands to include in the metal-ligand complexes of the present disclosure.

As stated above, the complex described herein comprises a metal and a ligand that are able to reversibly bind and thus form an adduct with $CO_2$. According to further embodiments, the complex binds the $CO_2$ such that the structure of the $CO_2$ molecule is altered to a non-linear form. According to still further embodiments, the disclosed complexes contain specific structural features, most importantly a bent $CO_2$ adduct which can be indicated by various analytical techniques such as single crystal X-ray crystallography or IR spectroscopy depending on the stability and lifetime of the formed adduct, which are able to cleave $CO_2$ under mild conditions. For the purposes of the present disclosure, the term "mild conditions" is intended to mean room temperature and atmospheric pressures, although elevated temperatures and elevated pressures may possibly enhance and facilitate the desired conversion of $CO_2$ to useful building blocks.

In general these specific structural features that are able to cleave $CO_2$ under extremely mild conditions include a metal that binds one of the nucleophilic oxygen atoms of the $CO_2$ and a ligand that provides a Lewis base site to bind the electrophilic carbon center of $CO_2$. According to some specific embodiments, the metal-ligand complex can take the form, for example, of a variety of di- and tri-valent metal bis- or tris(amides). Alternatively, the metal-ligand complex can be coordination complexes that contain neutral ligands with these metals, provided the ligands have at least one additional Lewis base site to bind to $CO_2$.

Figure 13:
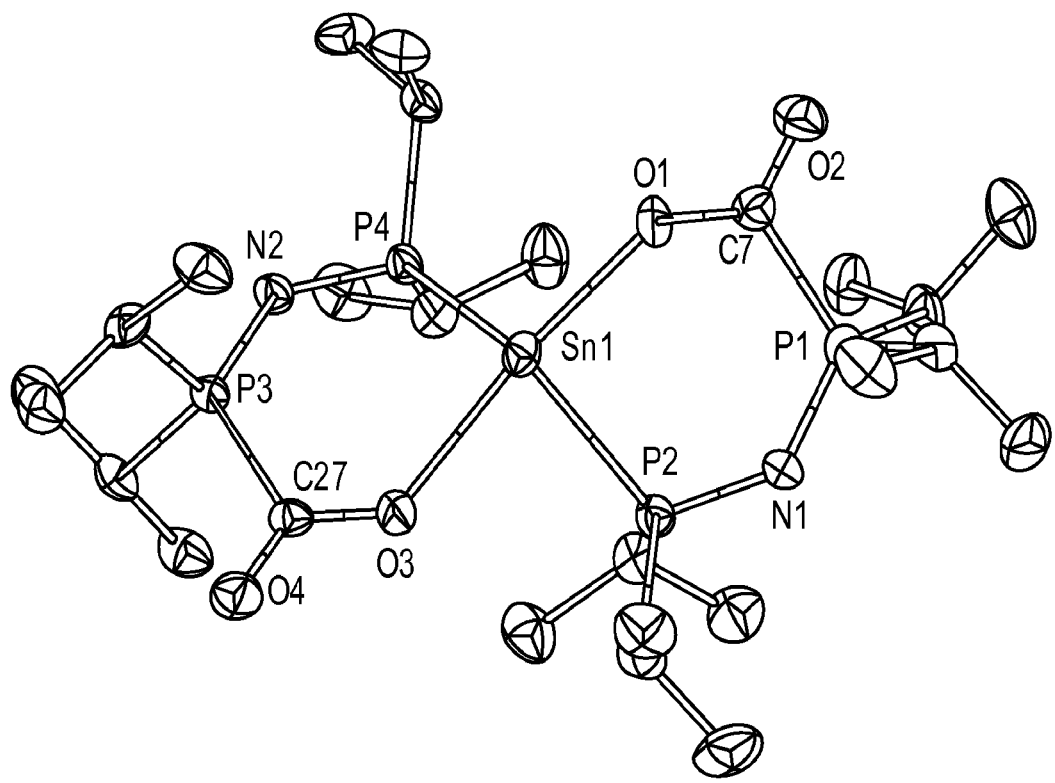
FIG. 13 is an illustration of the X-ray structure of the $Sn[O_2CP(i-Pr_2)NP(i-Pr_2)]_2$ complex.

Specific example of metal-ligand compounds of the present disclosure that are able to reversibly bind $CO_2$ are compounds formed between $ZnX_2$ and the ligands diphenyl-2-pyridylphosphine ($Ph_2Ppy$) or bis(2-pyridyl)phenylphosphine ($PhPpy_2$). Other examples include compounds formed between $Sn^{IV}X_4$ and the $Me_2N$-based ligand shown in FIG. 4, or $Sn[O_2CP(i-Pr_2)NP(i-Pr_2)]_2$, as shown in FIG. 13.

According to some embodiments, the $CO_2$ molecule bends when complexed with the metal-ligand compound to form the adduct. As described in greater detail in the Experimental section below, $CO_2/Zn$-$Ph_2Ppy$ and $CO_2/Zn$-$PhPpy_2$ adducts each present "bent" $CO_2$ molecules. For the purposes of the present disclosure, a $CO_2$ molecule is considered bent if the O—C—O bond deviates significantly (>15 degrees or so) from linearity as measured by X-ray crystallography, or if an adduct is shown to be formed by IR spectroscopy, as the resulting O—C—O bond will by necessity be bent due to coordination with the Lewis base lone pair from the ligand.

It will be well understood that while specific examples of metal-ligand complexes are described herein, other metal-ligand complexes are contemplated by the present disclosure and can be formed by selecting various combinations of the herein disclosed metals and ligands. For example, while substantial attention has been paid herein to the complexes formed between Zn and the ligands diphenyl-2-pyridylphosphine ($Ph_2Ppy$) and bis(2-pyridyl)phenylphosphine ($PhPpy_2$), it will be well understood that the same ligand could be paired with other metals including transition metals mentioned previously including Ti, Co, Zr, Mo, and main group metals such as Al, Ga, In, Sn, Pb, and Bi.

While the present application identifies a large group of possible candidates for use as components of the metal-ligand complex, it should be understood that the behavior of the adduct results from the specific structural and chemical arrangements of the atoms in each complex and thus while one particular combination may be able to bind or engage with $CO_2$ in one particular way, another combination may bind or engage in a different manner, with different final results. For example, $Sr[N(PPh_2)_2]_2$ reacts with $CO_2$ at room temperature and atmospheric pressure in a matter of minutes to produce not only the expected, previously-unknown —$O_2CN(PPh_2)_2$ carbamate, but the reaction with $CO_2$ also quite unexpectedly cleaves the —$N(PPh_2)_2$ moiety to produce the novel —$[N(CO_2)_3]^{3-}$ trianion.[42] Notably, the $Ca[N(PPh_2)_2]_2$ derivative gives identical chemistry to the Sr analog, but the smaller $Mg[N(PPh_2)_2]_2$ complex does not undergo similar chemistry. Moreover, in the starting materials the ligands are bound to the metal via different binding modes—in the Mg case the —$NR_2$ group is N-bound directly as an amido ligand; however, in the larger Ca and Sr cases the —$NR_2$ ligands are bound in a π-fashion using the P—N—P atoms.

Figure 2:
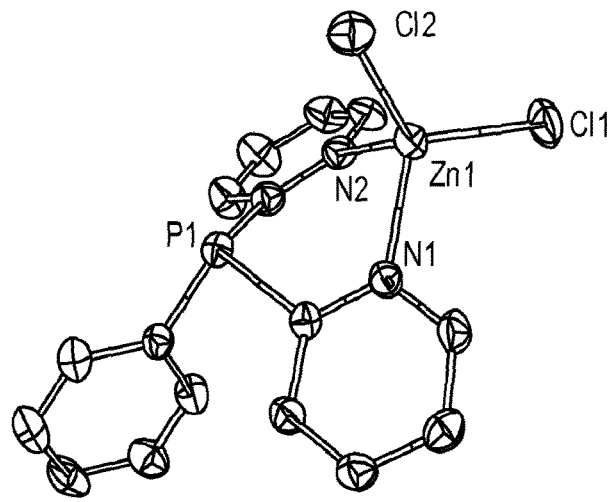
FIG. 2 is an illustration of the X-ray structure of the $ZnCl_2$ complex of bis(2-pyridyl)phenylphosphine ($PhPpy_2$)
Figure 3:
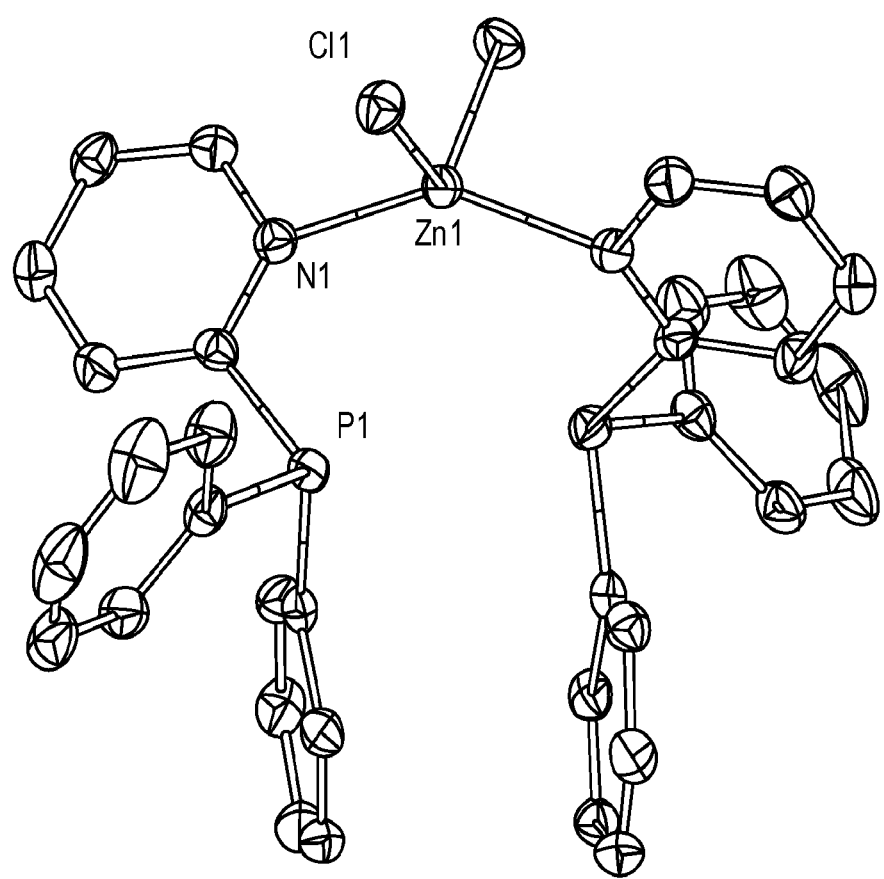
FIG. 3 is an illustration of the X-ray structure of the $ZnCl_2$ complex of diphenyl-2-pyridylphosphine ($Ph_2Ppy$).

As another example, it has been determined that the $CO_2$ cleavage reaction is especially favored when the resulting metal product binds the cleaved O-atom as the central, $\mu_4$-O atom in a tetrahedral $[M_4O]^{6+}$ structure. As examples, the interaction of $Sn[N(SiMe_3)_2]_2$ with COS and the reaction of cyclic $Sn\{N[SiMe_2(CH_2)]_2\}_2$ (a tied-back analog of $Sn[N(SiMe_3)_2]_2$) with $CO_2$ both result in the same core $[Sn_4O]^{6+}$ structure, with the central bridging O atom arising from the facile cleavage of $CO_2$.[2, 4] A typical structure is shown in FIG. 2. This basic structure is also seen using the zinc complex $Zn\{N[SiMe_2(CH_2)]_2\}_2$. Accordingly, it appears that the $[M_4O]^{6+}$ structural motif is thermodynamically favored and thus, when cleavage of the $CO_2$ molecule is the desired result, it may be desirable to select the specific metal and ligand combination and/or tune the combination such that the resulting metal-ligand complexes are capable of engaging in this type of interaction.

Interestingly, it is postulated that for some ligands, such as those generically shown in FIGS. 10-12, different structural isomers may be formed depending on whether the metal complex is hard or soft, or whether the donor atom D is hard or soft. Softer metals may tend to coordinate the phosphine as the donor, leaving the pendant N-atoms on the pyridyl rings as the donor to $CO_2$, while harder metals may coordinate the pyridyl ligands (as shown in FIGS. 10-12) and leave the phosphine to serve as the Lewis base to $CO_2$.[76] This flexibility offers the advantage of the ability to tweak the system by metal choice in order to obtain a desired product. Quite obviously, there are many synthetic variations on the structure of the electron-rich ligands as well, and such variations can be exploited to further tune the system. Accordingly, the present disclosure provides for a variety of different metal-ligand complexes, the individual suitability of which for any particular reaction may be determined and, in fact, tuned, to the specific desired reaction conditions, reactants, and final products.

As stated above, the present disclosure further provides a novel mechanism for carbon dioxide reduction facilitated by the novel complexes disclosed herein. According to this embodiment, $CO_2$ is exposed to a metal-ligand complex as disclosed herein under suitable conditions to enable the $CO_2$ to form an adduct with the complex, with the adduct lifetime ranging from transient to stable enough to be characterized by single crystal X-ray diffraction. The unique nature of the binding arrangement between the metal-ligand complexes of the present disclosure and the $CO_2$ molecule, wherein the bound $CO_2$ is bent, presents the opportunity to reduce the $CO_2$ more easily by reducing the high energy penalty associated with converting linear $CO_2$ into other geometries. Because the presently described metal-ligand complexes are formed using readily available and relatively inexpensive metals, this method provides an easier and less expensive pathway than is currently available for a variety of $CO_2$-based reactions including, but not necessarily limited to, conversion, reduction and/or electrocatalytic reduction of $CO_2$.

Figure 14:
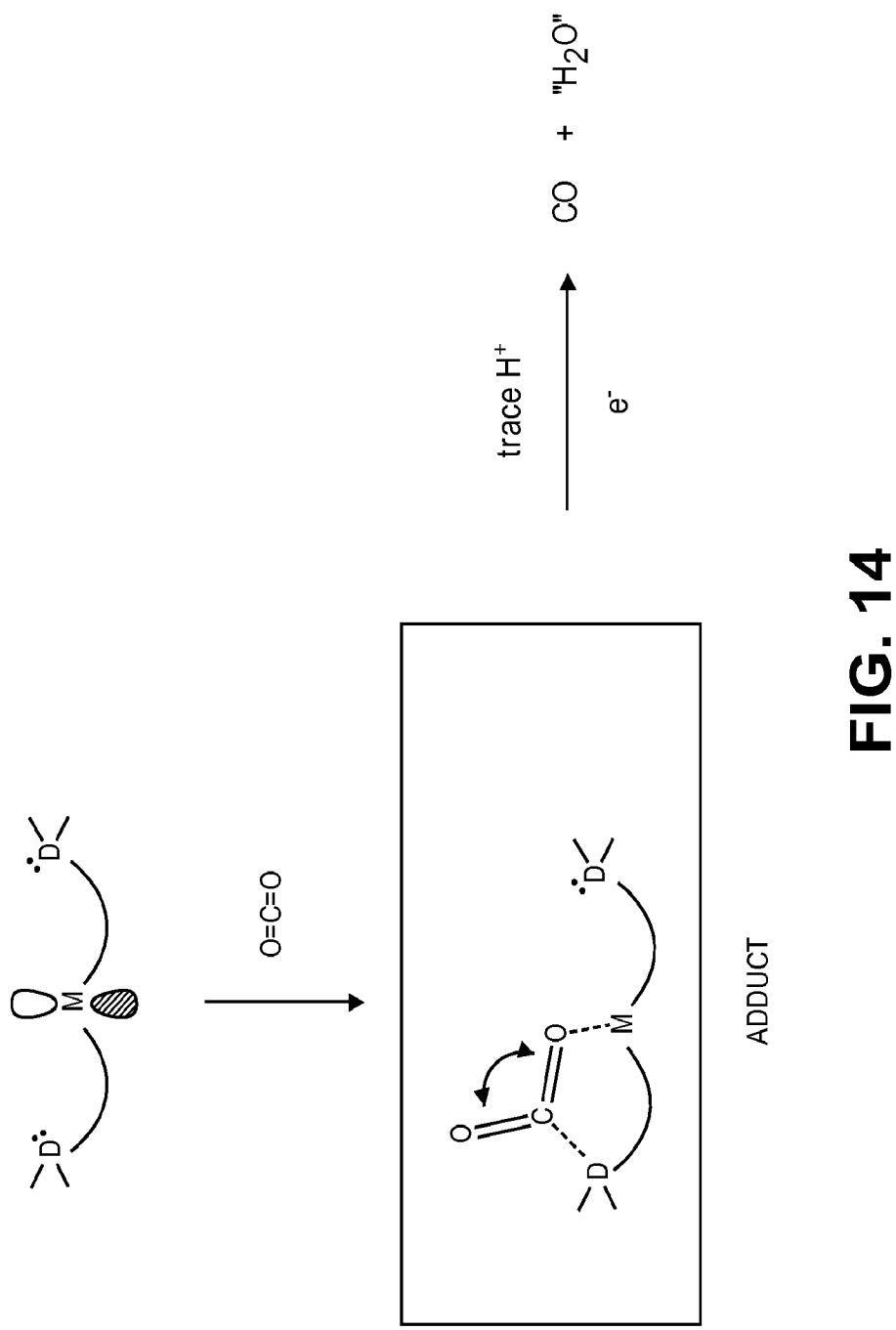
FIG. 14 is a schematic illustration of an electrochemical conversion of $CO_2$ using the methods shown and described herein.

An exemplary scheme for electrocatalytic reduction of $CO_2$ using a metal-ligand complex formed from zinc and a metal-ligand complex as described herein is shown in FIG. 14. As shown generically, $CO_2$ binds the metal-ligand complex to form an adduct in which the $CO_2$ molecule is bent. Trace amounts of hydrogen ions (protons) and electrical energy then convert the adduct into carbon monoxide and water.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

1. Page, G.; Felix, A. M.; Dickie, D. A.; Chen, L.; Kemp, R. A., Yellow and blue make green: the importance of stoichiometry in the reaction of 1,4-bis(2,6-diisopropylphenyl)-1,4-diazabutadiene with dimethylgallium chloride. *Main Group Chem.* 2010, 9, 11-21.
2. Stewart, C. A.; Dickie, D. A.; Parkes, M. V.; Saria, J. A.; Kemp, R. A., Reactivity of bis(2,2,5,5-tetramethyl-2,5-disila-1-azacyclopent-1-yl)tin with $CO_2$, OCS, and $CS_2$ and comparison to that of bis[bis(trimethylsilyl)amido] tin. *Inorg. Chem.* 2010, 49, 11133-11141.
3. Stewart, C. A.; Dickie, D. A.; Moasser, B.; Kemp, R. A., Reactions of $CO_2$ and related heteroallenes with $CF_3$-substituted aromatic silylamines of tin. *Polyhedron* 2012, 32, 14-23.
4. Stewart, C. A.; Dickie, D. A.; Tang, Y.; Kemp, R. A., Insertion reactions of $CO_2$, OCS, and $CS_2$ into the Sn—N bonds of $(Me_2N)_2Sn$: NMR and X-ray structural characterization of the products. *Inorg. Chim. Acta* 2011, 376, 73-79.
5. Dickie, D. A.; Coker, E. N.; Kemp, R. A., Formation of a reversible, intramolecular main-group metal-$CO_2$ adduct. *Inorg. Chem.* 2011, 50, 11288-11290.
6. Dickie, D. A.; Gislason, K. B.; Kemp, R. A., Formation of phosphino-substituted isocyanate by reaction of $CO_2$ with group 2 complexes based on the $(Me_3Si)(i-Pr_2P)NH$ ligand. *Inorg. Chem.* 2012, 51, 1162-1169.
7. Barry, B. M.; Dickie, D. A.; Wetherby, A. E.; Barker, W. E.; Larsen, C. A.; Waterman, R.; Geiger, W. E.; Kemp, R. A., $CO_2$ interactions with main group compounds directed towards preparing useful organic products. *Prepr. Pap.-Am. Chem. Soc., Div. Fuel Chem.* 2012, 57, 294-296.
8. Steele, L. A. M.; Boyle, T. J.; Kemp, R. A.; Moore, C., The selective insertion of carbon dioxide into a lanthanide(III) 2,6-di-t-butyl-phenoxide bond. *Polyhedron* 2012, 42, 258-264.
9. Felix, A. M.; Dickie, D. A.; Horne, I. S.; Page, G.; Kemp, R. A., Addition of aluminum and gallium species to aromatic and alkyl-substituted 1,4-diaza-1,3-butadiene ligands. *Inorg. Chem.* 2012, 51, 4650-4662.
10. Stewart, C. A.; Dickie, D. A.; Kemp, R. A., Investigation of metal cyclam complexes as potential catalysts for the production of dimethyl carbonate. *Inorg. Chim. Acta*, 2012, 392, 268-276.
11. Dickie, D. A.; Kemp, R. A., Structures and $CO_2$ reactivity of zinc complexes of bis(diisopropyl-) and bis(diphenylphosphino)amines *Organometallics*, 2014, 33, 6511-6518.
12. Felix, A. M.; Boro, B. J.; Dickie, D. A.; Tang, Y.; Saria, J. A.; Moasser, B.; Stewart, C. A.; Frost, B. J.; Kemp, R. A., Insertion of $CO_2$ into divalent group 2 and 12 bis (silylamides). *Main Group Chem.* 2012, 11, 13-29.
13. Arakawa, H.; Aresta, M.; Armor, J. N.; Barteau, M. A.; Beckman, E. J.; Bell, A. T.; Bercaw, J. E.; Creutz, C.; Dinjus, E.; Dixon, D. A.; Domen, K.; DuBois, D. L.; Eckert, J.; Fujita, E.; Gibson, D. H.; Goddard, W. A.; Goodman, D. W.; Keller, J.; Kubas, G. J.; Kung, H. H.; Lyons, J. E.; Manzer, L. E.; Marks, T. J.; Morokuma, K.; Nicholas, K. M.; Periana, R.; Que, L.; Rostrup-Nielson, J.; Sachtler, W. M. H.; Schmidt, L. D.; Sen, A.; Somorjai, G. A.; Stair, P. C.; Stuits, B. R.; Tumas, W., Catalysis research of relevance to carbon management: progress, challenges, and opportunities. *Chem. Rev.* 2001, 101, 953-996.
14. Sakakura, T.; Choi, J.-C.; Yasuda, H., Transformation of carbon dioxide. *Chem. Rev.* 2007, 107, 2365-2387.
15. Darensbourg, D. J., Making plastics from carbon dioxide: Salen metal complexes as catalysts for the production of polycarbonates from epoxides and $CO_2$. *Chem. Rev.* 2007, 107, 2388-2410.
16. Darensbourg, D. J.; Holtcamp, M. W., Catalysts for the reactions of epoxides and carbon dioxide. *Coord. Chem. Rev.* 1996, 153, 155-174.
17. Yin, X.; Moss, J. R., Recent developments in the activation of carbon dioxide by metal complexes. *Coord. Chem. Rev.* 1999, 181, 27-59.
18. Martin, R.; Kleij, A. W., Myth or reality? Fixation of carbon dioxide into complex organic matter under mild conditions. *ChemSusChem* 2011, 4, 1259-1263.
19. Peters, M.; Köhler, B.; Kuckshinrichs, W.; Leitner, W.; Markewitz, P.; Miller, T. E., Chemical technologies for exploiting and recycling carbon dioxide into the value chain. *ChemSusChem* 2011, 4, 1216-1240.
20. Quadrelli, E. A.; Centi, G.; Duplan, J.-L.; Perathoner, S., Carbon dioxide recycling: emerging large-scale technologies with industrial potential. *ChemSusChem* 2011, 4, 1194-1215.
21. North, M.; Pasquale, R.; Young, C., Synthesis of cyclic carbonates from epoxides and $CO_2$. *Green Chem.* 2010, 12, 1514-1539.
22. Darensbourg, D. J.; Mackiewicz, R. M.; Phelps, A. L.; Billodeaux, D. R., Copolymerization of $CO_2$ and epoxides catalyzed by metal salen complexes. *Acc. Chem. Res.* 2004, 37, 836-844.
23. Chisholm, M. H.; Extine, M., Carbon dioxide exchange reactions involving early transition metal N,N-dimethylcarbamato compounds. Reversible insertion of carbon dioxide into transition metal-nitrogen σ-bonds. *Chem. Commun.* 1975, 438-439.
24. Chisholm, M. H.; Navarro-Llobet, D.; Zhou, Z., Poly (propylene carbonate). 1. More about poly(propylene carbonate) formed from the copolymerization of propylene oxide and carbon dioxide employing a zinc glutarate catalyst. *Macromolecules* 2002, 35, 6494-6504.
25. Jeske, R. C.; Rowley, J. M.; Coates, G. W., Pre-rate-determining selectivity in the terpolymerization of epoxides, cyclic anhydrides, and $CO_2$: a one-step route to diblock copolymers. *Angew. Chem. Int. Ed.* 2008, 47, 6041-6044.
26. Rowley, J. M.; Lobkovsky, E. B.; Coates, G. W., Catalytic double carbonylation of epoxides to succinic anhydrides: catalyst discovery, reaction scope, and mechanism. *J. Am. Chem. Soc.* 2007, 129, 4948-4960.
27. Cohen, C. T.; Chu, T.; Coates, G. W., Cobalt catalysts for the alternating copolymerization of propylene oxide and carbon dioxide: combining high activity and selectivity. *J. Am. Chem. Soc.* 2005, 127, 10869-10878.
28. Moore, D. R.; Cheng, M.; Lobkovsky, E. B.; Coates, G. W., Mechanism of the alternating copolymerization of epoxides and $CO_2$ using β-diiminate zinc catalysts: Evidence for a bimetallic epoxide enchainment. *J. Am. Chem. Soc.* 2003, 125, 11911-11924.
29. Aresta, M.; Dibenedetto, A., Catalyst development for the utilization of $CO_2$ as building block for chemicals. *Chim. Ind.* 2007, 89, 142-147.
30. Aresta, M.; Dibenedetto, A., Utilisation of $CO_2$ as a chemical feedstock: opportunities and challenges. *Dalton Trans.* 2007, 2975-2992.

31. Jessop, P. G.; Joo, F.; Tai, C.-C., Recent advances in the homogeneous hydrogenation of carbon dioxide. *Coord. Chem. Rev.* 2004, 248, 2425-2442.
32. Jessop, P. G.; Ikariya, T.; Noyori, R., Homogeneous hydrogenation of carbon dioxide. *Chem. Rev.* 1995, 95, 259-272.
33. Getty, A. D.; Tai, C.-C.; Linehan, J. C.; Jessop, P. G.; Olmstead, M. M.; Rheingold, A. L., Hydrogenation of carbon dioxide catalyzed by ruthenium trimethylphosphine complexes: a mechanistic investigation using high-pressure NMR spectroscopy. *Organometallics* 2009, 28, 5466-5477.
34. Leitner, W., The coordination chemistry of carbon dioxide and its relevance for catalysis: a critical study. *Coord. Chem. Rev.* 1996, 153, 257-284.
35. Omae, I., Aspects of carbon dioxide utilization. *Catal. Today* 2006, 115, 33-52.
36. Song, C., Global challenges and strategies for control, conversion and utilization of $CO_2$ for sustainable development involving energy, catalysis, adsorption and chemical processing. *Catal. Today* 2006, 115, 2-32.
37. Jiang, Z.; Xiao, T.; Kuznetsov, V. L.; Edwards, P. P., Turning carbon dioxide into fuel. *Philos. Trans. R. Soc., A* 2010, 368, 3343-3364.
38. Mikkelsen, M.; Jorgensen, M.; Krebs, F. C., The teraton challenge. A review of fixation and transformation of carbon dioxide. *Energy Environ. Sci.* 2010, 3, 43-81.
39. Ma, J.; Sun, N.; Zhang, X.; Zhao, N.; Xiao, F.; Wei, W.; Sun, Y., A short review of catalysis for $CO_2$ conversion. *Catal. Today* 2009, 148, 221-231.
40. Centi, G.; Perathoner, S., Opportunities and prospects in the chemical recycling of carbon dioxide to fuels. *Catal. Today* 2009, 148, 191-205.
41. Sita, L. R.; Babcock, J. R.; Xi, R., Facile metathetical exchange between carbon dioxide and the divalent group 14 bisamides $M[N(SiMe_3)_2]_2$ (M=Ge and Sn). *J. Am. Chem. Soc.* 1996, 118, 10912-10913.
42. Dickie, D. A.; Parkes, M. V.; Kemp, R. A., Insertion of carbon dioxide into main-group complexes: formation of the $[N(CO_2)_3]^{3-}$ ligand. *Angew. Chem. Int. Ed.* 2008, 47, 9955-9957.
43. Tang, Y.; Zakharov, L. N.; Rheingold, A. L.; Kemp, R. A., Two new bulky amido ligands useful for the preparation of metal complexes and examples of their reactivity. *Inorg. Chim. Acta* 2006, 359, 775-781.
44. Tang, Y.; Kassel, W. S.; Zakharov, L. N.; Rheingold, A. L.; Kemp, R. A., Insertion reactions of carbon dioxide into Zn—N bonds: syntheses and structures of tetrameric and dimeric alkylzinc carbamato complexes. *Inorg. Chem.* 2005, 44, 359-364.
45. Tang, Y.; Felix, A. M.; Boro, B. J.; Zakharov, L. N.; Rheingold, A. L.; Kemp, R. A., Syntheses and X-ray crystal structures of monomeric zinc and mercury bis (silylamides). *Polyhedron* 2005, 24, 1093-1100.
46. Tang, Y.; Zakharov, L. N.; Rheingold, A. L.; Kemp, R. A., Insertion of carbon dioxide into Mg—N bonds. Structural characterization of a previously unknown $\eta^2$ chelation mode to magnesium in magnesium carbamates. *Organometallics* 2004, 23, 4788-4791.
47. Tang, Y.; Felix, A. M.; Zakharov, L. N.; Rheingold, A. L.; Kemp, R. A., Syntheses and structural characterization of a monomeric tin(II) diamide and a novel chlorotin(II) amide trimer. *Inorg. Chem.* 2004, 43, 7239-7242.
48. Tang, Y.; Felix, A. M.; Manner, V. W.; Zakharov, L. N.; Rheingold, A. L.; Moasser, B.; Kemp, R. A., Synthesis and characterization of divalent main group diamides and reactions with $CO_2$. *ACS Symp. Ser.* 2006, 917, 410-421.
49. Puddephatt, R. J., Chemistry of bis(diphenylphosphino) methane. *Chem. Soc. Rev.* 1983, 12, 99-127.
50. Zhao, X.; Stephan, D. W., Bis-boranes in the frustrated Lewis pair activation of carbon dioxide. *Chem. Commun.* 2011, 47, 1833-1835.
51. Peuser, I.; Neu, R. C.; Zhao, X.; Ulrich, M.; Schirmer, B.; Tannert, J. A.; Kehr, G.; Froehlich, R.; Grimme, S.; Erker, G.; Stephan, D. W., $CO_2$ and formate complexes of phosphine/borane frustrated Lewis pairs. *Chem. Eur. J.* 2011, 17, 9640-9650.
52. Menard, G.; Stephan, D. W., Stoichiometric reduction of $CO_2$ to CO by aluminum-based frustrated Lewis pairs. *Angew. Chem., Int. Ed.* 2011, 50, 8396-8399.
53. Geier, S. J.; Gilbert, T. M.; Stephan, D. W., Synthesis and reactivity of the phosphinoboranes $R_2PB(C_6F_5)_2$. *Inorg. Chem.* 2011, 50, 336-344.
54. Menard, G.; Stephan, D. W., Room temperature reduction of $CO_2$ to methanol by Al-based frustrated Lewis pairs and ammonia borane. *J. Am. Chem. Soc.* 2010, 132, 1796-1797.
55. Dureen, M. A.; Stephan, D. W., Reactions of boron amidinates with $CO_2$ and CO and other small molecules. *J. Am. Chem. Soc.* 2010, 132, 13559-13568.
56. Moemming, C. M.; Otten, E.; Kehr, G.; Froehlich, R.; Grimme, S.; Stephan, D. W.; Erker, G., Reversible metal-free carbon dioxide binding by frustrated Lewis pairs. *Angew. Chem., Int. Ed.* 2009, 48, 6643-6646.
57. Stephan, D. W., "Frustrated Lewis pairs": a concept for new reactivity and catalysis. *Org. Biomol. Chem.* 2008, 6, 1535-1539.
58. Agarwal, A. S.; Zhai, Y.; Hill, D.; Sridhar, N., The electrochemical reduction of carbon dioxide to formate/formic acid: engineering and economic feasibility. *ChemSusChem* 2011, 4, 1301-1310.
59. Tarasova, R. I.; Sinitsyna, N. I.; Mukhamedieva, R. R., Cycloaddition of imines and hydrazones derived from salicylaldehyde to isocyanatophosphines. Synthesis of biologically active phosphorylated N-acetylsemicarbazides and benzylureas. *Zh. Obshch. Khim.* 1997, 67, 1597-1601.
60. Tarasova, R. I.; Dvoinishnikova, T. A.; Sinitsyna, N. I.; Vasyakina, L. A.; Moskva, V. V., Synthesis of C-phosphorylated carbamates and study of their pesticidal activity. *Izv. Vyssh. Uchebn. Zaved., Khim. Khim. Tekhnol.* 1985, 28, 39-42.
61. Kato, M.; Ito, T., Facile carbon dioxide uptake by zinc(II)-tetraazacycloalkane complexes. 1. Syntheses, characterizations, and chemical properties of (monoalkyl carbonato) (tetraazacycloalkane)zinc(II) complexes. *Inorg. Chem.* 1985, 24, 504-508.
62. Kato, M.; Ito, T., Facile carbon dioxide uptake by zinc(II)-tetraazacycloalkane complexes. 2. X-ray structural studies of (μ-monomethyl carbonato)(1,4,8,11-tetraazacyclotetradecane)zinc(II) perchlorate, bis(n-monomethyl carbonato)tris[(1,4,8,12-tetraazacyclopentadecane)zinc(II)] perchlorate, and (monomethyl carbonato)(1,4,8,11-tetramethyl-1,4,8,11-tetraazacyclotetradecane)zinc(II) perchlorate. *Inorg. Chem.* 1985, 24, 509-514.
63. Zevenhoven, R.; Eloneva, S.; Teir, S., Chemical fixation of $CO_2$ in carbonates: routes to valuable products and long-term storage. *Catal. Today* 2006, 115, 73-79.
64. Enhancing support of transformative research at the National Science Foundation. *NSB-07-32*, 1.
65. Ibers, J. A., Reactivities of carbon disulfide, carbon dioxide, and carbonyl sulfide towards some transition-metal systems. *Chem. Soc. Rev.* 1982, 11, 57-73.

66. Jager, B., Developments in Fischer-Tropsch technology. *Stud. Surf. Sci. Catal.* 1998, 119, 25-34.
67. Savéant, J.-M., Molecular catalysis of electrochemical reactions. Mechanistic aspects. *Chem. Rev.* 2008, 108, 2348-2378.
68. Anson, F. C.; Shi, C.; Steiger, B., Novel multinuclear catalysts for the electroreduction of dioxygen directly to water. *Acc. Chem. Res.* 1997, 30, 437-444.
69. Coltman, J. P.; Wagenknecht, P. S.; Hutchison, J. E., Molecular catalysts for multielectron redox reactions of small molecules: the "cofacial metallodiporphyrin" approach. *Angew. Chem., Int. Ed.* 1994, 33, 1537-1554.
70. Rosenthal, J.; Nocera, D. G., Role of proton-coupled electron transfer in O—O bond activation. *Acc. Chem. Res.* 2007, 40, 543-553.
71. Drost, C.; B. Hitchcock, P.; F. Lappert, M.; J.-M. Pierssens, L., The novel, chelating C, N-bidentate 2,6-bis (dimethylamino)phenyl ligand (R-), showing ambidentate N,N'-character in $M(R)_2$ (M=Ge, Sn, Pb) and Sn(R)X [X=$N(SiMe_3)_2$, $CH(SiMe_3)_2$, Cl]. *Chem. Commun.* 1997, 1141-1142.
72. Cotton, F. A.; Daniels, L. M.; Jordan; Murillo, C. A., Symmetrical and unsymmetrical compounds having a linear $Co_3^{6+}$ chain ligated by a spiral set of dipyridyl anions. *J. Am. Chem. Soc.* 1997, 119, 10377-10381.
73. Kitamura, C.; Maeda, N.; Kamada, N.; Ouchi, M.; Yoneda, A., Synthesis of 2-(substituted methyl)quinolin-8-ols and their complexation with Sn(II). *J. Chem. Soc., Perkin Trans.* 1 2000, 781-785.
74. Hitchcock, P. B.; Lappert, M. F.; Pierssens, L. J. M.; Protchenko, A. V.; Uiterweerd, P. G. H., Synthesis and characterisation of twelve $Sn^{IV}$ diaryls and formation of a $Sn^{III}$ triaryl. *Dalton. Trans.* 2009, 4578-4585.
75. Saucedo Anaya, S. A.; Hagenbach, A.; Abram, U., Tricarbonylrhenium(I) and -technetium(I) complexes with bis(2-pyridyl)phenylphosphine and tris(2-pyridyl)phosphine. *Polyhedron* 2008, 27, 3587-3592.
76. Pearson, R. G., Hard and soft acids and bases, HSAB, part II: underlying theories. *J. Chem. Ed.* 1968, 45, 643-648.
77. Chilik, P. J., Preface: forum on redox-active ligands. *Inorg. Chem.* 2011, 50, 9737-9740.
78. Scarborough, C. C.; Wieghardt, K., Electronic structure of 2,2'-bipyridine organotransition-metal complexes. Establishing the ligand oxidation level by density functional theoretical calculations. *Inorg. Chem.* 2011, 50, 9773-9793.
79. Nawn, G.; Waldie, K. M.; Oakley, S. R.; Peters, B. D.; Mandel, D.; Patrick, B. O.; McDonald, R.; Hicks, R. G., Redox-active bridging ligands based on indigo diimine ("nindigo") derivatives. *Inorg. Chem.* 2011, 50, 9826-9837.
80. Ouch, K.; Mashuta, M. S.; Grapperhaus, C. A., Metal-stabilized thiyl radicals as scaffolds for reversible alkene addition via C—S bond formation/cleavage. *Inorg. Chem.* 2011, 50, 9904-9914.
81. Blackmore, K. J.; Ziller, J. W.; Heyduk, A. F., "Oxidative addition" to a zirconium(IV) redox-active ligand complex. *Inorg. Chem.* 2005, 44, 5559-5561.
82. Haneline, M. R.; Heyduk, A. F., C—C bond-forming reductive elimination from a zirconium(IV) redox-active ligand complex. *J. Am. Chem. Soc.* 2006, 128, 8410-8411.
83. Shapiro, P. J., The evolution of the ansa-bridge and its effect on the scope of metallocene chemistry. *Coord. Chem. Rev.* 2002, 231, 67-81.

EXPERIMENTAL

Formation of $Zn^{II}$ Complexes with diphenyl-2-pyridylphosphine ($Ph_2Ppy$) and bis(2-pyridyl)phenylphosphine ($PhPpy_2$) Ligands Complexes 1 (FIG. 3) and 2 (FIG. 2) were synthesized under inert conditions by reacting stoichiometric amounts of the respective ligand ($Ph_2Ppy$ for 1, $PhPpy_2$ for 2) with $Zn^{II}$ chloride. Initial product identity was confirmed with $^1$H- and $^{31}P\{^1H\}$-NMR spectroscopy, high resolution mass spectrometry and elemental analysis. The $^1$H-NMR spectra indicate protons are nearly identically shielded for 1 and 2. Structural features of both complexes were then confirmed by generating colorless crystals suitable for single-crystal X-ray diffraction upon slow evaporation of dichloromethane solutions of each. Coordination through the nitrogen for both of these ligands to Zn was expected due to the "softer" nature of P compared to N. Both complexes exhibit distorted tetrahedral geometries around Zn, with similar and unremarkable Zn—Cl and Zn—N bond lengths. The most notable structural distinction arises from the degree of this distortion illustrated by the different angles around the central Zn atom: 110.01° for 1 and 98.74° for 2. Importantly, the lone pair of electrons on phosphorus is significantly more accessible for 2 than 1 which may explain why 2 is more reactive with $CO_2$.

The two Zn complexes were subjected to cyclic voltammetric studies to gain an understanding of their redox behavior. At a glassy carbon electrode in THF, complexes 1 and 2 undergo an irreversible 1-electron reduction at half-wave potentials of approximately −1.80 and −2.03 V vs. $Fc^{0/+}$, respectively. The more negative potential required to reduce 2 suggests that an inner-sphere electron transfer mechanism is occurring for each Zn complex, altering the oxidation state of Zn from +2 to the rare low valent +1 state. Generation of the proposed anionic Zn(I) species requires an electron to enter a 4s orbital since the 3d shell is already filled, accounting for the high potentials required for electron transfer to occur. We propose that the chelating groups are inactive in the electron-transfer process and the additional phenyl rings around 2 induce a more electron-rich Zn atom compared to 1, resulting in a more negative $E_{red}^{1/2}$ for 2. Reversibility was utterly undetectable within observable the potential window. A diffusional reduction occurs for both 1 and 2, and no significant change of structure takes place upon reduction.

To determine the reactivity of 1 and 2 with $CO_2$, samples of each complex were subjected to $CO_2$ bubbling through 0.20 M solutions in THF. Results indicate that 1 does not form a isolable $CO_2$ adduct since the IR spectrum after the reaction workup and isolation of the product failed to indicate any change in the isolated product. 2, on the other hand, revealed a new stretch at 1726 cm$^{-1}$ after 30 minutes of room temperature reaction time, suggesting the formation of a new species, 2'. This species is proposed to be unstable under ambient conditions since crystallization attempts failed and solution NMR did not provide evidence of a new species. Our previously-reported stable adducts indicate stronger bonding between the organometallic species and $CO_2$ with a C—O stretch at 1629 cm$^{-1}$.[6] The higher C—O frequency observed here indicates a weaker bond between 2 and $CO_2$, corroborating our suspicion of an ephemeral $CO_2$-containing 2' species.

Cyclic voltammetry was employed to determine if 2 could lessen the overpotential required to reduce $CO_2$. The onset of the reduction peak shifted anodically by approximately 0.6 V with the application of a negative potential to 2 under a $CO_2$ atmosphere. This voltammogram is consistent with the IR data because it suggests a CE mechanism is occurring. We propose that a 2' species is responsible for the electron transfer process associated with the observed cathodic wave beginning at approximately $-1.29$ V vs. $Fc^{0/+}$. This proposed CE mechanism for $CO_2$ reduction by 2 is evident as a first-order catalytic pathway. The linear sweep voltammogram (LSV) reveals a reduction wave peaking at ca. $-1.66$ V vs. $Fc^{0/+}$ even at very low concentrations of 2 when a saturated $CO_2$ atmosphere is present. This catalytic peak is observed only as a shoulder in voltammetric scans at higher concentrations, suggesting a competitive EC mechanism exists which has not been explored in depth at this time. Turnover frequency for 2 was determined using a method known to those skilled in the art, and calculated to be 96 $s^{-1}$ at 25° C. and 1 atm $CO_2$.

Controlled potential electrolysis (CPE) was used to investigate the fate of ca. 1 mM of 2 when subjected to a saturated $CO_2$ solution at a potential of $-1.80$ V vs. $Fc^{0/+}$ in 0.10 M $Bu_4NPF_6$ in THF. Degradation of 2 was not detected as evidenced by identical NMR spectra before and after the CPE experiment ($^{31}$P-NMR δ=19.5 ppm in THF, 300 MHz). This result was anticipated since electrolysis was conducted at a potential ca. 0.15 V more positive than the onset potential for 2. Excitingly, the evolution of carbon monoxide is surmised, as indicated in the mass spectra obtained before and after bulk electrolysis. The head space of the electrolysis cell was measured for gas composition using an airtight syringe and injection into a GC/MS instrument. In the spectrum obtained prior to CPE, the peak at 44 m/z is assigned to $CO_2$ with the other minor peaks in the spectrum a result of experimental error associated with the lack of utter airtight apparatus. After 4 hours of CPE, $CO_2$ is no longer prevalent in the mass spectrum and a peak at 28 m/z is dominant. We ascribe the mass of 28 to be mostly CO, since $N_2$ does not have a reasonable chemical pathway of evolution.

What is claimed is:

1. A method for the electrocatalytic reduction of carbon dioxide ($CO_2$) comprising:
    providing a complex comprising a ligand and a metal;
        exposing the $CO_2$ to the complex under suitable conditions such that an adduct is formed between the $CO_2$ and the complex; and
        providing electrochemical energy and trace protons to the adduct to reduce $CO_2$.

2. The method of claim 1 wherein the adduct comprises non-linear $CO_2$.

3. The method of claim 2 wherein the ligand provides a Lewis base site to bind the electrophilic carbon center of $CO_2$ and the metal binds one of the nucleophilic oxygen atoms of the $CO_2$.

4. The method of claim 1 wherein the complex consists of a ligand and a metal.

5. The method of claim 4 wherein the metal is a main group metal or an inexpensive transition metal.

6. The method of claim 4 wherein the metal is selected from the group consisting of Sn, Zn, Ti, Zr, Cr, Mo, Mn, Fe, Co, and Sb.

7. The method of claim 1 wherein the adduct consists of the complex and $CO_2$.

8. The method of claim 1 wherein the ligand has the chemical structure $-N(PR_2)_2$, where R is an alkyl or aryl group.

9. The method of claim 1 wherein the compound is selected from the group consisting of Zn diphenyl-2-pyridylphosphine ($Ph_2Ppy$) and Zn bis(2-pyridyl)phenylphosphine ($PhPpy_2$).

10. An adduct comprising a complex formed from a ligand and a metal and a non-linear $CO_2$ molecule.

11. The adduct of claim 10 wherein the adduct consists of a ligand, a metal, and the non-linear $CO_2$ molecule.

12. The adduct of claim 11 wherein the ligand in the complex provides a Lewis base site to bind the electrophilic carbon center of $CO_2$ and the metal binds one of the nucleophilic oxygen atoms of the $CO_2$.

13. The adduct of claim 11 wherein the ligand has the chemical structure $-N(PR_2)_2$, where R is an alkyl or aryl group.

14. The adduct of claim 11 wherein the metal is selected from the group consisting of Sn, Zn, Ti, Zr, Cr, Mo, Mn, Fe, Co, and Sb.

15. The adduct of claim 10 wherein the ligand in the complex provides a Lewis base site to bind the electrophilic carbon center of $CO_2$ and the metal binds one of the nucleophilic oxygen atoms of the $CO_2$.

16. The adduct of claim 10 wherein the ligand has the chemical structure $-N(PR_2)_2$, where R is an alkyl or aryl group.

17. The adduct of claim 10 wherein the metal is a main group metal or an inexpensive transition metal.

18. The adduct of claim 10 wherein the metal is selected from the group consisting of Sn, Zn, Ti, Zr, Cr, Mo, Mn, Fe, Co, and Sb.

19. The adduct of claim 10 wherein the adduct is selected from the group consisting of Zn diphenyl-2-pyridylphosphine ($Ph_2Ppy$) and Zn bis(2-pyridyl)phenylphosphine ($PhPpy_2$).

20. An organometallic complex comprising a ligand and a metal wherein the ligand is diphenyl-2-pyridylphosphine ($Ph_2Ppy$) or bis(2-pyridyl)phenylphosphine ($PhPpy_2$) and the metal is Zn.

* * * * *